(12) United States Patent
Trippel et al.

(10) Patent No.: US 9,522,671 B2
(45) Date of Patent: Dec. 20, 2016

(54) METHOD AND SYSTEM FOR CONTROLLING A HYBRID VEHICLE

(71) Applicant: GM GLOBAL TECHNOLOGY OPERATIONS LLC, Detroit, MI (US)

(72) Inventors: Travis James Trippel, Howell, MI (US); Brett T. Muller, Milford, MI (US); Michael R. Colville, Fenton, MI (US); Anthony H. Heap, Ann Arbor, MI (US); Dean Christopher Degazio, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 134 days.

(21) Appl. No.: 14/185,227

(22) Filed: Feb. 20, 2014

(65) Prior Publication Data

US 2015/0232084 A1    Aug. 20, 2015

(51) Int. Cl.
| | |
|---|---|
| *B60W 20/00* | (2016.01) |
| *B60W 10/06* | (2006.01) |
| *B60W 10/08* | (2006.01) |
| *B60W 10/26* | (2006.01) |
| *B60W 50/00* | (2006.01) |

(52) U.S. Cl.
CPC ............ *B60W 20/106* (2013.01); *B60W 10/06* (2013.01); *B60W 10/08* (2013.01); *B60W 10/26* (2013.01); *B60W 20/13* (2016.01); *B60W 20/40* (2013.01); *B60W 50/0097* (2013.01); *B60W 2520/10* (2013.01); *B60W 2550/141* (2013.01); *B60W 2550/402* (2013.01); *B60W 2710/244* (2013.01); *Y02T 10/6291* (2013.01); *Y02T 10/84* (2013.01); *Y10S 903/93* (2013.01)

(58) Field of Classification Search
CPC .... B60W 20/106; B60W 10/26; B60W 10/08; B60W 20/40; B60W 10/06; B60W 20/1062; B60W 20/104; B60W 20/13; B60W 50/0097; B60W 2250/141; B60W 2710/244; B60W 2520/10; B60W 2550/402; Y10S 903/93; Y02T 10/6291; Y02T 10/84

See application file for complete search history.

(56) References Cited

U.S. PATENT DOCUMENTS 9,079,581 B1 * 7/2015 Li ..................... B60W 20/106
  701/22
2012/0035795 A1 * 2/2012 Yu .................... B60W 50/0097
  701/22

\* cited by examiner

*Primary Examiner* — John Q Nguyen
*Assistant Examiner* — Michael Kerrigan
(74) *Attorney, Agent, or Firm* — Quinn Law Group

(57) ABSTRACT

A method can be used to control a hybrid vehicle and includes the following steps: (a) receiving, via a control module, an input; (b) determining, via the control module, whether the hybrid vehicle is traveling on a highway based, at least in part, on a vehicle speed and an output torque request; (c) commanding, via the control module, the hybrid powertrain to switch from a charge-depletion mode to a blended mode if the hybrid vehicle is traveling on a highway; and (d) commanding, via the control module, the hybrid powertrain to use energy from the energy storage device via the electric motor-generator so as to maintain a substantially constant target state of charge (SOC) discharge rate.

15 Claims, 3 Drawing Sheets

METHOD AND SYSTEM FOR CONTROLLING A HYBRID VEHICLE

TECHNICAL FIELD

The present disclosure relates to a method and system for controlling a hybrid powertrain.

BACKGROUND

A hybrid vehicle includes a hybrid powertrain, which includes a transmission, an internal combustion engine, a fuel source, at least one electric motor-generator, and an energy storage device. Accordingly, the hybrid vehicle can be propelled by the internal combustion engine, the electric motor-generator, or both.

SUMMARY

It is useful to control a hybrid vehicle so as to minimize fuel consumption. To do so, the hybrid vehicle may be controlled using the methods described in the present disclosure. In an embodiment, the method includes the following steps: (a) receiving, via a control module, an input; (b) determining, via the control module, whether the hybrid vehicle is traveling on a highway based, at least in part, on a vehicle speed and an output torque request; (c) commanding, via the control module, the hybrid powertrain to switch from a charge-depletion mode to a blended mode if the hybrid vehicle is traveling on a highway after receiving the input; and (d) commanding, via the control module, the hybrid powertrain to use energy from the energy storage device via the electric motor-generator so as to maintain a substantially constant state of charge (SOC) discharge rate after the hybrid powertrain switches from the charge-depletion mode to the blended mode. The target SOC discharge rate is a rate at which a SOC of the energy storage device decreases over time or distance while the hybrid powertrain operates in the blended mode. In the blended mode, the hybrid powertrain uses power from the internal combustion engine and the electric motor-generator to propel the hybrid vehicle, whereas, in the charge-depletion mode, the hybrid powertrain only uses energy from the energy storage device to propel the hybrid vehicle.

In an embodiment, the method of controlling the hybrid vehicle includes the following steps: (a) comparing, via a control module, a current state of charge (SOC) of the energy storage device with a minimum SOC threshold in order to determine if the current SOC is greater than the minimum SOC threshold; (b) receiving, via a control module, a trip distance data, wherein the trip distance data includes a trip distance of a desired trip; (c) commanding, via the control module, the hybrid powertrain to operate in a blended mode only if the current SOC of the energy storage device is greater than the minimum SOC threshold; and (d) commanding, via the control module, the hybrid powertrain to use energy from the energy storage device so as to maintain a substantially constant target SOC discharge rate. The target SOC discharge rate is a rate at which the current SOC of the energy storage device decreases over time while the hybrid powertrain operates in the blended mode. Further, the target SOC discharge rate is based, at least in part on the trip distance.

The present disclosure also relates to a system for controlling a hybrid vehicle. In an embodiment, the system includes a hybrid powertrain. The hybrid vehicle includes an energy storage device, a fuel source, an internal combustion engine fluidly coupled to the fuel source, and an electric motor-generator electrically connected to the energy storage device. The system further includes a control module specifically programmed to execute the instructions of either of the methods described above. It is envisioned that the control module may be specifically programmed to execute the instructions for both of the methods described above.

The above features and advantages and other features and advantages of the present invention are readily apparent from the following detailed description of the best modes for carrying out the invention when taken in connection with the accompanying drawings.

DETAILED DESCRIPTION

Figure 1:
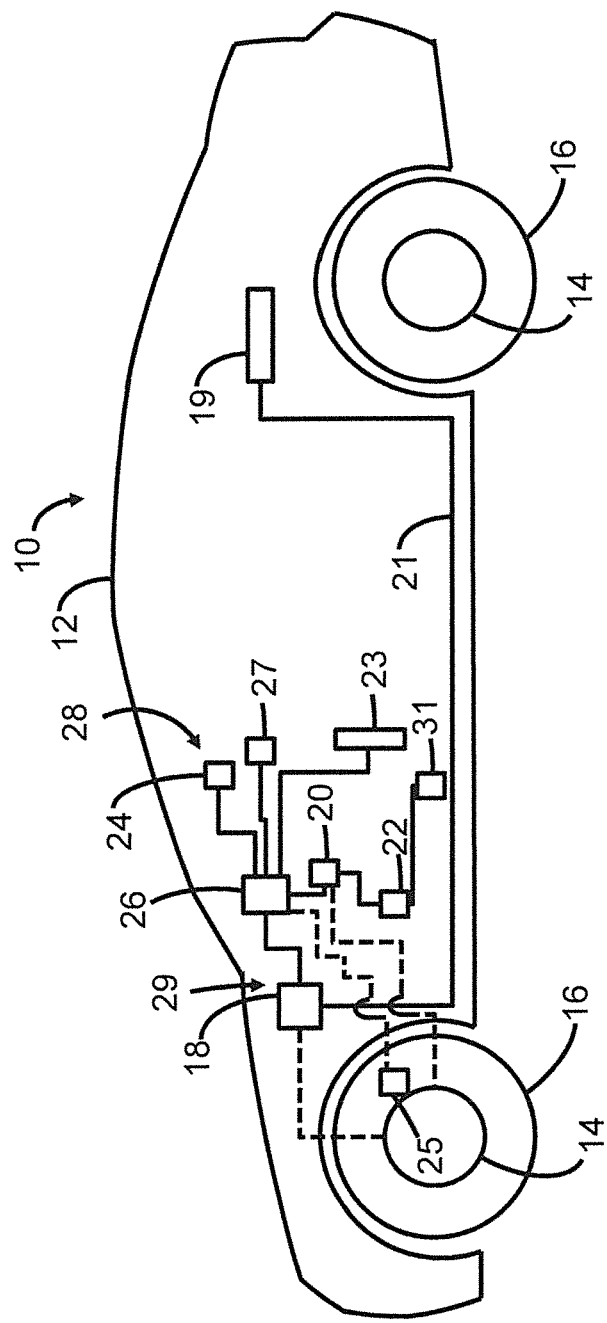
FIG. 1 is a schematic diagram of a hybrid vehicle.

Referring to the drawings in which like elements are identified with identical numerals throughout, FIG. 1 schematically illustrates a hybrid vehicle 10, such as a plug-in hybrid electric vehicle (PHEV) or an extended-range electric vehicle (EREV). In the depicted embodiment, the hybrid vehicle 10 includes a vehicle body 12 and a plurality of wheels 14 operatively coupled to the vehicle body 12. Each wheel 12 is coupled to a tire 16. The hybrid vehicle 10 further includes a hybrid powertrain 29. The hybrid powertrain 29 includes an internal combustion engine 18 operatively coupled to at least one of the wheels 14. The hybrid vehicle 10 further includes a fuel source 19, such as a fuel tank, in fluid communication with the internal combustion engine 18. A conduit 21 fluidly couples the fuel source 19 to the internal combustion engine 18. The internal combustion engine 18 is therefore fluidly couple to the fuel source 19. The fuel source 19 contains a fuel, such as gasoline, and can therefore supply fuel to the internal combustion engine 18 via the conduit 21. In operation, the internal combustion engine 18 can combust the fuel supplied by the fuel source 19 in order to generate torque. The torque generated by the internal combustion engine 18 can be transmitted to the wheels 14 in order to propel the hybrid vehicle 10.

The hybrid powertrain 29 additionally includes at least one electric motor-generator 20 and an energy storage device 22 electrically connected to the electric motor-generator 20. The energy storage device 22 may be a battery, battery pack, fuel cell, or a combination thereof and can supply electrical energy to the electric motor-generator 20. Aside from being electrically connected to the energy storage device 22, the electric motor-generator 20 is operatively coupled to the internal combustion engine 18 and can therefore receive mechanical energy (e.g., torque) from the internal combustion engine 18. The electric motor-generator 20 is also operatively coupled to at least one of the wheels 14 and can therefore be used to drive the wheels 14.

The electric motor-generator 20 can operate in motoring mode and generating mode. In the motoring mode, the electric motor-generator 20 can convert the electrical energy received from the energy storage device 22 into mechanical energy (e.g., torque). When operating in the motoring mode, the electric motor-generator 20 can transmit mechanical energy (e.g., torque) to the wheels 14 in order to propel the hybrid vehicle 10. In the generating mode, the electric motor-generator 20 can receive mechanical energy (e.g., torque) from the internal combustion engine 18 and converts the mechanical energy into electrical energy. The electrical energy generated by the electric motor-generator 20 can then be transmitted to the energy storage device 22.

The hybrid powertrain 29 and hybrid vehicle 10 can operate in a charge-depletion mode. In the charge-depletion mode, the hybrid vehicle 10 only uses the electrical energy from the energy storage device 22. In other words, in the charge-depletion mode, the hybrid powertrain 29 may only use energy from the energy storage device 22 to propel the hybrid vehicle 10. Accordingly, the electrical energy stored in the energy storage device 22 is depleted when the hybrid vehicle 10 is operated in the charge-depletion mode. In other words, the hybrid vehicle 10 only uses the electrical energy stored in the energy storage device 22 when operating in the charge-depletion mode. In one example, in the charge-depletion mode, the hybrid powertrain 29 only uses power from the electric motor-generator 20 to propel the hybrid vehicle 10. In another example, when the hybrid powertrain 29 operates in the charge-depletion mode, most of the power used to propel the hybrid vehicle 10 originates from the electric motor-generator 20.

The hybrid powertrain 29 and hybrid vehicle 10 can also operate in a charge-sustaining mode. In the charge-sustaining mode, the hybrid vehicle 10 only uses the energy from the fuel source 19 and, therefore, the electrical energy stored in the energy storage device 22 is not depleted. As a consequence, the state of charge (SOC) of the energy storage device 22 is maintained while the hybrid vehicle 10 operates in the charge-sustaining mode. In one example, in the charge-sustaining mode, the hybrid powertrain 29 only uses power from the internal combustion engine 18 to propel the hybrid vehicle 10. In another example, when the hybrid powertrain 29 operates in the charge-sustaining mode, most of the power used to propel the hybrid vehicle 10 originates from the internal combustion engine 18.

The hybrid powertrain 29 and hybrid vehicle 10 can also operate in a blended mode. In the blended mode, the hybrid powertrain 29 uses power from the internal combustion engine 18 and the electric motor-generator 20 to propel the hybrid vehicle 10. In other words, the hybrid powertrain 29 uses energy from the energy storage device 22 and the fuel source 19 to power the hybrid vehicle 10.

A navigation system 24 is coupled to the hybrid vehicle 10. The navigation system 24 may be part of the hybrid vehicle 10 or external to the hybrid vehicle 10. Regardless of its location, the navigation system 24 can receive input data from a user regarding a desired trip. In other words, the navigation system 24 can receive input data specific to the desired trip. The input data may include, but is not limited to, the destination of the desired trip. Upon receipt of the input data from the user, the navigation system 24 may determine route data specific to the desired trip. The route data may include, but is not limited to, a starting point, trip route (e.g., fastest route), trip distance, and travel time. As used herein, the term "trip distance" refers to a distance from the starting point to the destination of the desired trip.

The hybrid vehicle 10 further includes a control module 26 in electronic communication with the navigation system 24, electric motor-generator 20, and internal combustion engine 18. The terms "control module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. The control module 26 is specifically programmed to execute the steps of the method 100 (FIG. 2), the method 200 (FIG. 3), or both. In the present disclosure, the control module 26 includes at least one processor and at least one associated memory and can receive route data relating to the desired trip from the navigation system 24. Accordingly, the control module 26 is in electronic communication with the navigation system 24. The navigation system 24 and control module 26 may be part of a system 28 for controlling the hybrid vehicle 10 and hybrid powertrain 29. The system 28 can also be used to control the hybrid powertrain 29.

The internal combustion engine 18, the electric motor-generator 20, control module 26, and energy storage device 22 may be part of the hybrid powertrain 29. The hybrid powertrain 29 is configured to propel the hybrid vehicle 10. The hybrid powertrain 29 can also operate in a charge-sustaining mode and a charge-depletion mode as discussed above with respect to the hybrid vehicle 10. The control module 26 is not necessarily part of the hybrid powertrain 29.

The hybrid powertrain 29 also includes a torque request actuator 23, such as an accelerator pedal, operatively coupled to the control module 26. As such, actuation of the torque request actuator 23 causes the control module 26 to command the hybrid powertrain 29 to generate additional output torque and transmit that additional output torque to the wheels 14. As a non-limiting example, the torque request actuator 23 may be an accelerator pedal that can be depressed to request additional output torque from the hybrid powertrain 29.

The hybrid vehicle 10 further includes a speed sensor 25 capable of determining the speed of the hybrid vehicle 10. The speed sensor 25 may be an inductive or optical sensor and may be operatively coupled to the wheel 14 or the transmission of the hybrid vehicle 10. Regardless of the kind of sensor employed, the speed sensor 25 is in communication (e.g., electronic communication) with the control module 26. Accordingly, the control module 26 can receive inputs from the speed sensor 25 that are indicative of the speed of the hybrid vehicle 10 (i.e., the vehicle speed). The hybrid vehicle 10 may further includes a state of charge (SOC) sensor 31 operatively coupled to the energy storage device 22. The SOC sensor 31 is in electronic communication with the control module 26 and can determine the current SOC of the energy storage device 22. In operation, the SOC sensor 31 can generate a signal indicative of the SOC of the energy storage device 22. Further, the SOC sensor 31 can send the generated signal to the control module 26.

Aside from the speed sensor 25, the hybrid vehicle 10 includes at least one interface 27 in communication (e.g., electronic communication) with the control module 26. The interface 27 is capable of receiving an input from a user. In response to the input from the user, the interface 27 generates an input signal representative of the user's input. Moreover, the interface 27 can send the input signal to the control module 26. For example, the interface 27 may be a touch-screen or at least one button that the user (e.g., driver or passenger) can press in order to send an input signal to the control module 26. As discussed in detail below, the control module 26 can command the hybrid powertrain 29 to shift from the charge-depletion mode to the blended mode upon receipt of an input from the user through the interface 27.

Figure 2:
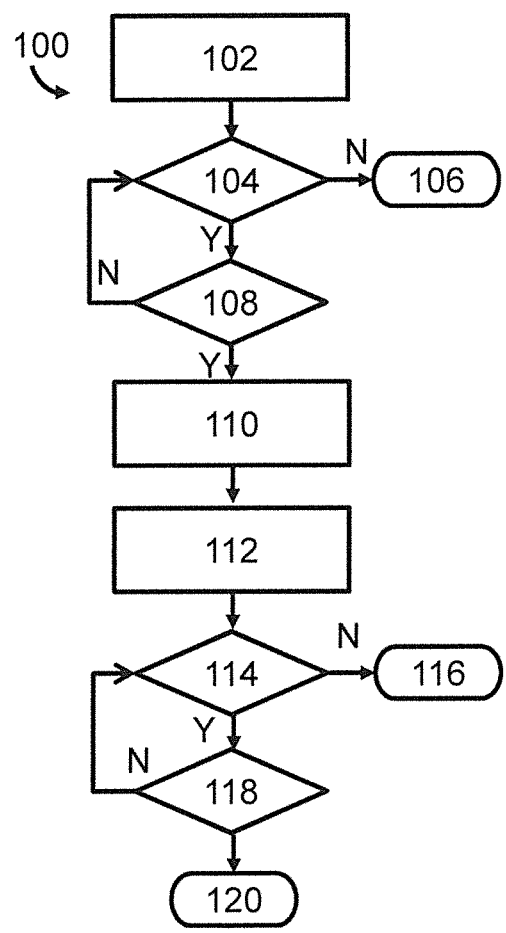
FIG. 2 is a flowchart illustrating a method for controlling a hybrid vehicle.

FIG. 2 illustrates a flowchart of a method 100 for controlling the hybrid powertrain 29 or the hybrid vehicle 10. The method 100 begins at step 102, in which the control module 26 receives an input from a user (e.g., passenger or driver) via the interface 27. Step 102 therefore entails receiving, via the control module 26, an input from the user. The input at step 102 may be referred to as the first input. After receiving the input from the user, the method 100 continues to step 104.

Step 104 entails determining, via the control module 26, whether the hybrid powertrain 29 is operating in the charge-sustaining mode. In other words, in step 104, the control module 26 determines whether the hybrid powertrain 29 is operating in the charge-depletion mode. To do so, the control module 26 may monitor the internal combustion engine 18 and the electric motor-generator 20. If the hybrid powertrain 29 is not operating in the charge-depletion mode, then the method 100 proceeds to step 106. In step 106, the method 100 ends and, accordingly, the hybrid powertrain 29 continues to operate in accordance with a default operation plan. The default operation plan may be stored in the control module 26. If the hybrid powertrain 29 is operating in the charge-depletion mode, then the method 100 continues to step 108.

Step 108 entails determining, via the control module 26, whether the hybrid vehicle 10 is traveling on a highway based, at least in part, on a vehicle speed and an output torque request. To do so, the control module 26 can determine the vehicle speed based on the input from the speed sensor 25. Moreover, the control module 26 can determine the output torque request based on the input from the torque request actuator 23. Using the vehicle speed and the output torque request, the control module 26 can determine whether the hybrid vehicle 10 is traveling on a highway. For instance, the control module 26 can determine that the hybrid vehicle 10 is traveling on the highway if the vehicle speed is greater than a speed threshold and the output torque request is greater than a torque threshold. If the hybrid vehicle 10 is not traveling on the highway, then the control module 26 continues to monitor the vehicle speed and output torque request and the method 100 returns to step 104. At this point, the hybrid powertrain 29 continues to operate in accordance with a default operation plan. On the other hand, if the hybrid vehicle 10 is traveling on the highway, then the method 100 continues to step 110.

Step 110 entails commanding, via the control module 26, the hybrid powertrain 29 to switch from the charge-depletion mode to the blended mode if the hybrid vehicle 10 is traveling on the highway after receiving the input from the user in step 102. As discussed above, in the charge-depletion mode, the hybrid powertrain 29 only uses power from the electric motor-generator 20 to propel the hybrid vehicle 10. In the blended mode, the hybrid powertrain 29 uses power from the internal combustion engine 18 and the electric motor-generator 20 to propel the hybrid vehicle 10. Then, the method 100 proceeds to step 112.

Step 112 entails commanding, via the control module 26, the hybrid powertrain 29 to use energy from the energy storage device 22 via the electric motor-generator 20 so as to maintain a substantially constant target state of charge (SOC) discharge rate while the hybrid vehicle 10 is traveling on the highway. The SOC discharge rate is a rate at which a SOC of an energy storage device 22 decreases over time or distance while the hybrid powertrain 29 operates in the blended mode. In step 112, the control module 26 commands the hybrid powertrain 29 to maintain a substantially constant target SOC discharge rate. It is useful to maintain a substantially constant target SOC discharge rate in order to minimize fuel consumption. Step 112 may be conducted only after the hybrid powertrain 29 switches from the charge-depletion mode to the blended mode. The target SOC discharge rate may be retrieved from a lookup table stored in the control module 26 and may be based, at least in part, on an expected distance to be traveled by the hybrid vehicle 10 (i.e., the expected travel distance or trip distance). The expected travel distance or trip distance may be obtained from the navigation system 24 or through the interface 27. The interface 27 may be a touchscreen, a knob, or any other suitable device capable to receive input from a user. In addition, the expected travel distance or trip distance may be obtained from a lookup table stored in the control module 26 or by hard coding a value in the control module 26. Steps 110 and 112 can be conducted simultaneously. Next, the method 100 proceeds to step 114.

Step 114 entails determining whether the control module 26 has received a second input from the user via the interface 27. If the control module 26 received the second input from the user via the interface 27, then the method 100 proceeds to step 116. In step 116, the method 100 ends, and the control module 26 commands the hybrid powertrain 29 to switch from the blended mode to the charge-sustaining mode or the charge-depletion mode in accordance with the default operation plan. If the control module 26 does not receive the second input from the user via the interface 27, then the method 100 continues to step 118.

Step 118 entails comparing, via the control module 26, the current SOC of the energy storage device 22 with a minimum SOC threshold. To do so, the control module 26 monitors the SOC of the energy storage device 22 and then compares the current SOC of the energy storage device 22 with the minimum SOC threshold. If the current SOC of the energy storage device 22 is not equal to or less than the minimum SOC threshold, then the method 100 returns to step 114. On the other hand, if the current SOC of the energy storage device 22 is equal to or less than the minimum SOC threshold, then the method 100 proceeds to step 120. In step 120, the method 100 ends, and the control module 26 commands the hybrid powertrain 29 to switch from the blended mode to the charge-sustaining mode in accordance with the default operation plan stored in the control module 26.

Figure 3:
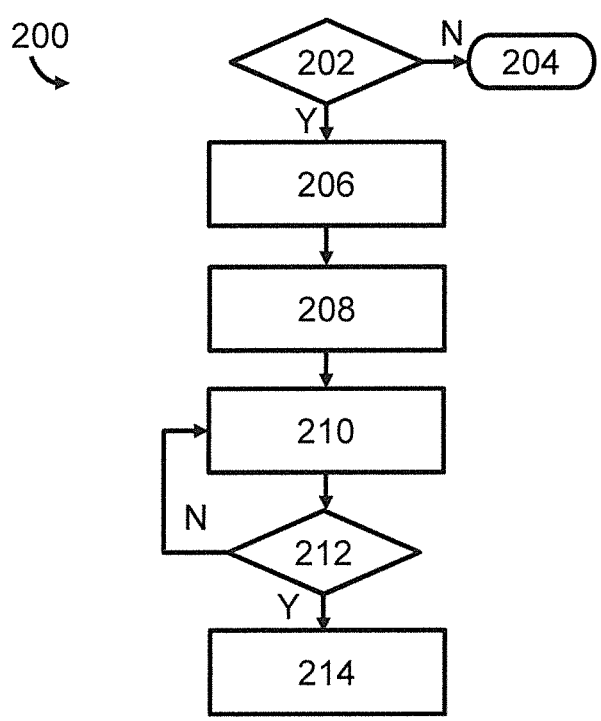
FIG. 3 is a flowchart illustrating a method for controlling a hybrid vehicle in accordance with another embodiment of the present disclosure.

FIG. 3 illustrates a flowchart of a method 200 for controlling the hybrid powertrain 29 or the hybrid vehicle 10 in accordance with another embodiment of the present disclosure. The method begins at step 202. Step 202 entails comparing, via the control module 26, the current state of charge (SOC) of the energy storage device 22 with a minimum SOC threshold in order to determine if the current SOC is greater than the minimum SOC threshold. The control module 26 can determine the current SOC of the energy storage device 22 based, at least in part, on input from a SOC sensor 31 operatively coupled to the energy storage device 22. In other words, the control module 26 is programmed to compare a current state of charge (SOC) of the energy storage device 22 with a minimum SOC threshold in order to determine if the current SOC is greater than the minimum SOC threshold. To do so, the control module 26 is in electronic communication with the energy storage device 22 and can therefore determine and monitor the current SOC of the energy storage device 22. The minimum SOC threshold may be stored in the control module 26. If the current SOC of the energy storage device 22 is not greater than the minimum SOC threshold, then the method 200 continues to step 204. In step 204, the method 200 ends and, accordingly, the control module 26 commands the hybrid powertrain 29 to operate in accordance with a default operation plan, which may be stored in the control module 26. On the other hand, if the current SOC is greater than the minimum SOC threshold, then the method 200 continues to step 206.

Step 206 entails receiving, via the control module 26, a trip distance data from the user. The trip distance data includes a trip distance of a desired trip. The trip distance means a specific distance or distance range from a starting point, which may be the current location of the hybrid vehicle 10, to the desired destination of the desired trip. In other words, the control module 26 is programmed to receive the trip distance data from the user. The control module 26 may receive the trip distance data through the navigation system 24. As discussed above, the navigation system 24 is in communication (e.g., electronic communication) with the control module 26. As a non-limiting example, the user may input the desired destination into the navigation system 24 and, then, the navigation system 24 may determine the trip distance. Next, the navigation system 24 transmits the trip distance data, which includes the trip distance, to the control module 26. Alternatively, the user may directly input trip distance data through the interface 27 that is in electronic communication with the control module 26. As a non-limiting example, the user may input the specific trip distance of the desired trip or a trip distance range. The user, for example, may select different trip distance ranges via the interface 27 (e.g., buttons or touch screen). Thus, the control module 26 may receive the trip distance data through the navigation system 24, the interface 27, or both. Next, the method 200 proceeds to step 208.

Step 208 entails commanding, via the control module 26, the hybrid powertrain 29 to operate in the blended mode only if the current SOC is greater than the minimum SOC threshold. As discussed above, in the blended mode, the hybrid powertrain 29 uses power from the internal combustion engine 18 and the electric motor-generator 20 to propel the hybrid vehicle 10. In other words, the control module 26 is programmed to command the hybrid powertrain 29 to operate in the blended mode only if the current SOC is greater than the minimum SOC threshold. To do so, the control module 26 commands both the internal combustion engine 18 and the electric motor-generator 20 to generate output torque and transmit the generated output torque to the wheels 14 in order to propel the hybrid vehicle 10. Then, the method 200 continues to step 210.

Step 210 entails commanding, via the control module 26, the hybrid powertrain 29 to use energy from the energy storage device 22 so as to maintain a substantially constant target SOC discharge rate. In other words, the control module 26 is programmed to command the hybrid powertrain 29 to use energy from the energy storage device 22 so as to maintain a substantially constant target SOC discharge rate. The SOC discharge rate is the rate at which the SOC of the energy storage device decreases over time while the hybrid powertrain 29 operates in the blended mode. Further, the target SOC discharge rate is based, at least in part on the trip distance. Steps 208 and 210 can be conducted simultaneously. Next, the method 200 proceeds step 212.

Step 212 entails comparing, via the control module 26, the current state of charge (SOC) of the energy storage device 22 with the minimum SOC threshold in order to determine if the current SOC is equal to or less than the minimum SOC threshold after commanding the hybrid powertrain 29 to operate in the blended mode. Therefore, in step 212, the control module compares the current state of charge (SOC) of the energy storage device 22 with the minimum SOC threshold after commanding the hybrid powertrain 29 to operate in the blended mode. To do so, the control module 26 monitors the SOC of the energy storage device 22 and then compares the current SOC of the energy storage device 22 with the minimum SOC threshold to determine if the current SOC of the energy storage device 22 is equal to or less than the minimum SOC threshold. If the current SOC is not equal to or less than the minimum SOC threshold after commanding the hybrid powertrain 29 to operate in the blended mode, the method 200 returns to step 210. Conversely, if the current SOC is equal to or less than the minimum SOC threshold after commanding the hybrid powertrain 29 to operate in the blended mode, then the method 200 continues to step 214.

Step 214 entails commanding, via the control module 26, the hybrid powertrain 29 to switch from the blended mode to a charge-sustaining mode when the current SOC of the energy storage device is equal to or less than the minimum SOC threshold. In other words, in step 214, the control module 26 can command the hybrid powertrain 29 to switch from the blended mode to the charge-sustaining mode when the current SOC of the energy storage device is equal to or less than the minimum SOC threshold. As discussed above, in the charge-sustaining mode, the hybrid powertrain 29 only uses power from the internal combustion engine 18 to propel the hybrid vehicle 10. When the hybrid powertrain 29 operates in the charge-sustaining mode, the electric motor-generator 20 may operate in the generating mode and, therefore, convert the mechanical energy received from the internal combustion engine 18 into electrical energy.

While the best modes for carrying out the invention have been described in detail, those familiar with the art to which this invention relates will recognize various alternative designs and embodiments for practicing the invention within the scope of the appended claims. The steps of the methods described above can be conducted in a different chronological order as the one described above.

The invention claimed is:

1. A method of controlling a hybrid vehicle, the hybrid vehicle including a hybrid powertrain, the hybrid powertrain including an energy storage device, a fuel source, an internal combustion engine fluidly coupled to the fuel source, and an electric motor-generator electrically connected to the energy storage device, the method comprising:

receiving, via a control module, an input from a user, the input indicating a desired destination receiving a speed of the vehicle from a vehicle speed sensor, and an output torque request of the vehicle from a torque request actuator;

determining, via the control module, whether the hybrid vehicle is traveling on a highway based, at least in part, on the speed of the vehicle and the output torque request of the vehicle;

commanding, via the control module, the hybrid powertrain to switch from a charge-depletion mode to a blended mode if the hybrid vehicle is traveling on the highway after receiving the input, wherein, in the blended mode, the hybrid powertrain uses power from the internal combustion engine and the electric motor-generator to propel the hybrid vehicle and, in the charge-depletion mode, the hybrid powertrain only uses energy from the energy storage device to propel the hybrid vehicle; and commanding, via the control module, the hybrid powertrain to use energy from the energy storage device via the electric motor-generator so as to maintain a substantially constant target state of charge (SOC) discharge rate after the hybrid powertrain switches from the charge-depletion mode to the blended mode, wherein the target SOC discharge rate is a rate at which a SOC of the energy storage device decreases over time while the hybrid powertrain operates in the blended mode, and the substantially constant target SOC discharge rate is a substantially constant value having units of percentage of charge of the energy storage device divided by time duration.

2. The method of claim 1, wherein the control module determines that the hybrid vehicle is traveling on the highway if the vehicle speed is greater than a speed threshold and the output torque request is greater than a torque request threshold.

3. The method of claim 2, wherein determining, via the control module, whether the hybrid vehicle is traveling on the highway based, at least in part, on the vehicle speed and the output torque request includes:

determining, via the control module, the vehicle speed based on a speed input from a speed sensor of the hybrid vehicle; and determining, via the control module, the output torque request based on an torque request input from a torque request actuator of the hybrid vehicle.

4. The method of claim 1, further comprising determining whether the hybrid powertrain is operating in the charge-depletion mode.

5. The method of claim 4, wherein commanding the hybrid powertrain to switch from the charge-depletion mode to the blended mode is performed only if the hybrid powertrain is operating in the charge-depletion mode.

6. The method of claim 1, wherein the target SOC discharge rate is based, at least in part, on an expected distance to be traveled by the hybrid vehicle.

7. The method of claim 1, wherein the input is a first input, and the method further includes receiving, via the control module, a second input from a user and commanding the hybrid powertrain to switch from the blended mode to at least one of a charge-sustaining mode and the charge-depletion mode when the control module receives the second input, the second input indicating a manual override of a current hybrid powertrain mode.

8. The method of claim 1, further comprising commanding, via the control module, the hybrid powertrain to switch from the blended mode to a charge-sustaining mode when the SOC of the energy storage device reaches a minimum SOC threshold.

9. A system for controlling a hybrid vehicle, comprising:
a hybrid powertrain including:
an energy storage device;
a fuel source;
an internal combustion engine fluidly coupled to the fuel source;
an electric motor-generator electrically connected to the energy storage device a vehicle speed sensor configured to measure a speed of the vehicle; a torque request actuator configured to receive an output torque request from a user of the vehicle; and
a control module programmed to:
receive an input from a user, the input indicating a desired destination receive the speed of the vehicle from the vehicle speed sensor, and the output torque request from the torque request actuator;
determine whether the hybrid vehicle is travelling on a highway based, at least in part, on the speed of the vehicle and the output torque request;
command the hybrid powertrain to switch from a charge-depletion mode to a blended mode if the hybrid vehicle is traveling on the highway, wherein, in the blended mode, the hybrid powertrain uses power from the internal combustion engine and the electric motor-generator to propel the hybrid vehicle and, in the charge-depletion mode, the hybrid powertrain only uses energy from the energy storage device to propel the hybrid vehicle; and
command the hybrid powertrain to use power from the energy storage device via the electric motor-generator so as to maintain a substantially constant target state of charge (SOC) discharge rate after the hybrid powertrain switches from the charge-depletion mode to the blended mode, wherein the target SOC discharge rate is a rate at which a SOC of the energy storage device decreases over time while the hybrid powertrain operates in the blended mode, and the substantially constant target SOC discharge rate is a substantially constant value having units of percentage of charge of the energy storage device divided by time duration.

10. The system of claim 9, wherein the control module is programmed to determine that the hybrid vehicle is traveling on the highway if the vehicle speed is greater than a speed threshold and the output torque request is greater than a torque request threshold.

11. The system of claim 9, wherein the control module is programmed to determine whether the hybrid powertrain is operating in the charge-depletion mode.

12. The system of claim 11, wherein the control module commands the hybrid powertrain to switch from the charge-depletion mode to the blended mode only if the hybrid powertrain is operating in the charge-depletion mode.

13. The system of claim 9, wherein the target SOC discharge rate is based, at least in part, on an expected distance to be traveled by the hybrid vehicle.

14. The system of claim 9, wherein the input is a first input, and the control module is programmed to receive a second input from a user and command the hybrid powertrain to switch from the blended mode to at least one of a charge-sustaining mode and the charge-depletion mode upon receipt of the second input, the second input indicating a manual override of a current hybrid powertrain mode.

15. The system of claim 9, wherein the control module is programmed to command the hybrid powertrain to switch from the blended mode to a charge-sustaining mode when the SOC of the energy storage device reaches a minimum SOC threshold.

* * * * *